April 17, 1928.
F. G. FOLBERTH ET AL
1,666,127
WINDSHIELD CLEANER
Filed April 15, 1924
2 Sheets-Sheet 2
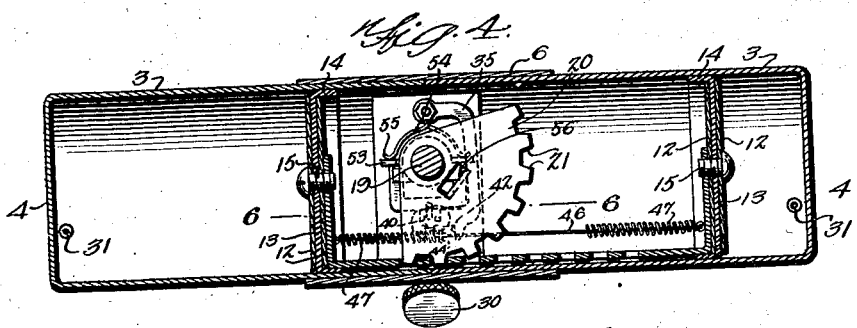
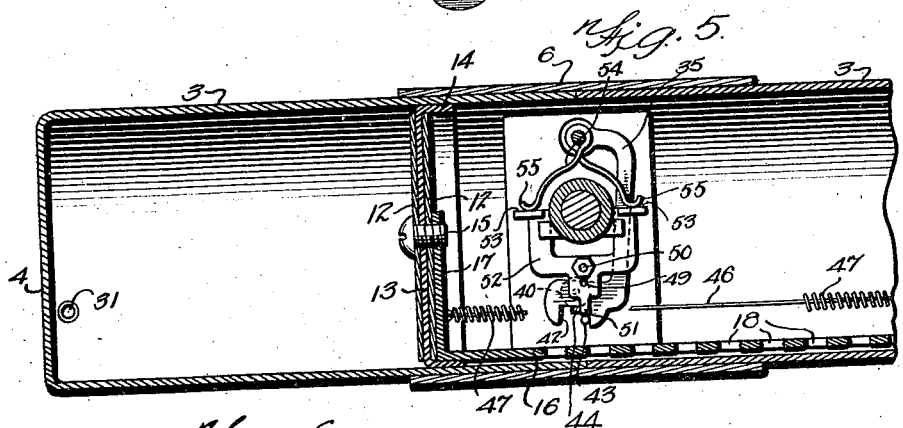
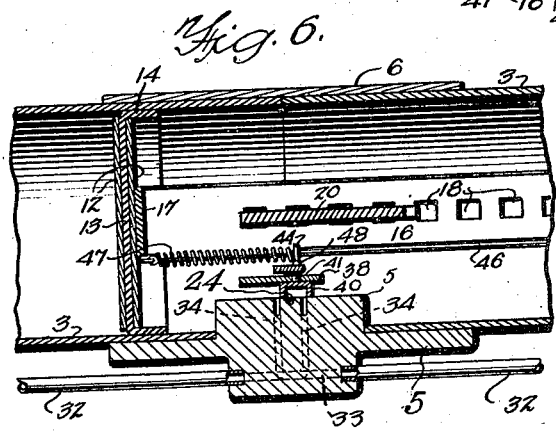
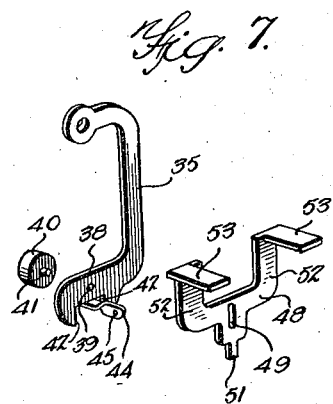
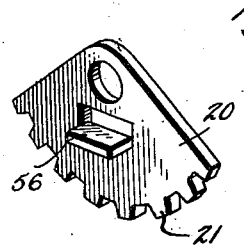
Inventors
F. G. Folberth
W. M. Folberth
By
Attorney Patented Apr. 17, 1928.

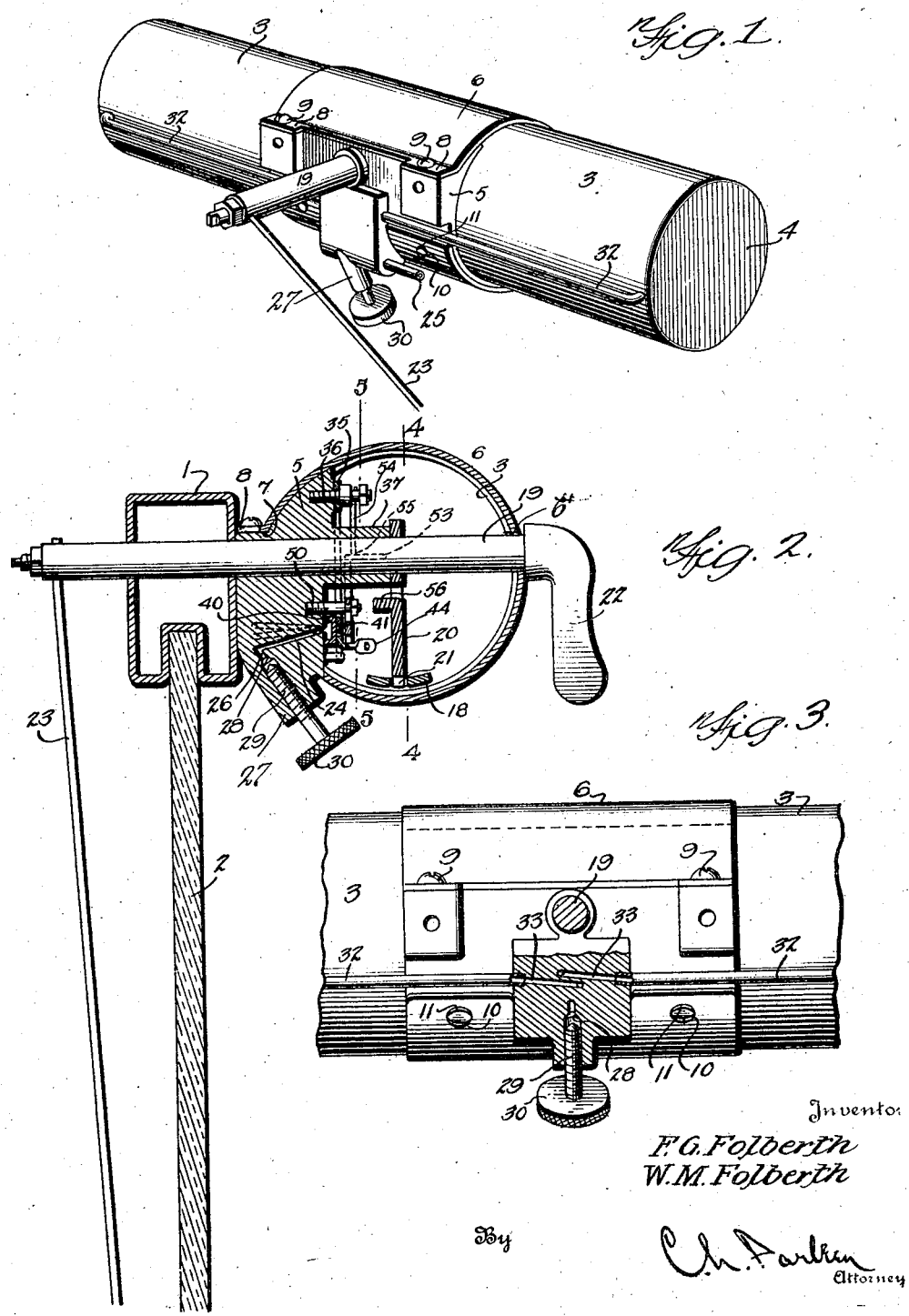

1,666,127

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed April 15, 1924. Serial No. 706,748.

This invention relates to windshield cleaners, and more particularly to valve actuating mechanism for windshield cleaner motors.

An object of the invention is the provision of a valve shifting mechanism in which a valve supporting member is locked in one position during the movement of the piston in one direction and a spring is placed under compression by the movement of the piston and brought into engagement with the valve supporting member, to shift the valve when the locking member is released.

A further object of the invention is the provision of valve mechanism in which the valve moves in the same direction that the piston is moving.

In the accompanying drawings, we have shown one embodiment of the invention. In this showing:

Figure 1 is a perspective view of the motor casing,

Figure 2 is a central transverse vertical sectional view through a motor casing arranged on a windshield frame, Figure 3 is an enlarged front elevation of the central portion of the motor casing, parts being shown in section, Figure 4 is a vertical longitudinal sectional view on line 4—4 of Figure 2, Figure 5 is an enlarged vertical longitudinal sectional view on line 5—5 of Figure 2, Figure 6 is an enlarged horizontal sectional view substantially on line 6—6 of Figure 4, Figure 7 is a detailed disassembled view of the valve and its associated parts, and, Figure 8 is a perspective view of a segmental gear.

Referring to the drawings, the reference numeral 1 designates a windshield frame of ordinary construction having a pane 2 of glass or other transparent material arranged therein. The motor for operating the windshield cleaner is adapted to be arranged on the interior of a vehicle and supported on the windshield frame. As shown, the motor casing consists of two cylindrical members 3, having closed outer ends 4. The open ends of the cylindrical members are adapted to be arranged in contact with each other to form a cylinder having closed ends. The edges of the cylindrical members are recessed for the reception of a closure plate 5 (see Figure 6). A clamping element consisting of a circular band 6 is secured to the top and bottom of the closure plate and surrounds the meeting edges of the sections of the casing. The upper portion of the closure plate is provided with a flat face 7 (see Figure 2) adapted to receive an offset portion 8, formed on one end of the band. The band is retained on the closure plate by means of screws 9 or other fastening elements. The other end of the band is provided with openings 10 adapted to receive ears 11 extending from the surface of the closure plate (see Figure 1). An actuating member consisting of a pair of pistons and a longitudinally extending connecting member is arranged within the cylinder. As shown, each piston consists of disks 12 of metal or other rigid material, slightly smaller in diameter than the diameter of the cylinder, having a sheet of rubber or other flexible material 13 arranged between them. The sheet 13 is of larger diameter than the cylinder, forming a flange or skirt 14 to prevent leakage. These members are provided with central openings for the reception of a bolt 15, or other fastening element. The pistons are maintained in spaced relation by means of a connecting member 16, having upwardly extending end portions 17. These end portions are provided with openings for the reception of the bolt 15. The central portion of the connecting member is provided with spaced openings 18, forming a rack.

The cleaner shaft 19 extends transversely of the motor casing and passes through a bore in the closure plate. A segmental gear 20 (see Figure 8) is mounted on the shaft and this gear is provided with teeth 21 adapted to mesh with the teeth formed by the openings 18. The inner end of the shaft projects from the motor casing and is provided with a handle 22, for manual operation. The outer end of the shaft extends through openings in the windshield frame and is adapted to receive a cleaner rod 23 to which a cleaner element (not shown) is secured and arranged to travel over the surface of the windshield when the shaft and cleaner rod are oscillated.

The motor is adapted to be actuated by suction or pressure and is connected to a source of suction or pressure, such as the intake manifold of an internal combustion engine through a passage 24 extending from the inner face of the closure plate and connected to a tube 25 extending from the exterior of the closure plate and adapted to receive a flexible conduit (not shown) extending to the source of suction or pressure. The passage 24 communicates with a passage 26 which is provided with an enlarged portion 27, forming a valve seat 28. The enlarged portion 27 is threaded and is adapted to engage threads formed on the stem of a valve 29. This valve projects from the bottom of the closures plate and is provided with a handle or wheel 30 to permit manual operation. Atmospheric pressure obtains in the space between the pistons by reason of the fact that the joint between the cylindrical members is not air tight. In the practical manufacture of this type of cleaner, air readily enters beneath the band 6 and between the members 3, as well as around the shaft 19, into the space between the pistons, but for the purposes of illustration, an air inlet is accentuated at 6'.

The opposite ends of the cylinder are provided with openings 31 and tubes or conduits 32, communicating with these openings as shown in Figure 1 of the drawings, and extending longitudinally of the cylinder to the edges of the closure plate. These tubes are in turn connected to longitudinally extending passages 33, which passages are inclined as shown in Figure 3 of the drawings, to permit them to pass each other. The inner ends of these passages communicate with inwardly extending passages 34, which extend to the inner faces of the closure plate and are arranged on opposite sides of the suction passage 24.

A valve supporting member 35 (see Figure 7) is pivotally mounted on a pin or bolt 36 projecting from the inner face of the closure plate adjacent the top of the cylinder. As shown, this member is centrally offset to permit it to pass around a sleeve 37 through which the cleaner shaft 19 extends. The lower end of the valve supporting member is provided with a horizontal arm 38 and this arm is provided with an opening 39. A cup-shaped valve 40 is arranged on the face of the closure plate and is provided with a stem 41 extending through the opening 39. The lower edge of the horizontal arm 38 of the valve supporting member is provided with a recess, forming shoulders 42. A pin 43 projects from the face of the closure plate and is adapted to be alternately engaged by these shoulders to limit the movement of the valve supporting member and valve to properly position the valve over the inlet passage 24 and one of the passages 34, as shown in Figure 6 of the drawings. The horizontal arm 38 is further provided with a projecting lug or finger 44, having an opening 45 therein. A wire 46, or other flexible member, extends from the inner face of one piston, through the opening 45, and is connected to the inner face of the other piston. Coil springs 47 are arranged on this wire adjacent each end.

A substantially T-shaped locking member 48 is arranged adjacent the valve supporting member. As shown, the T-shaped member is provided with an elongated slot 49, adapted to receive a pin 50 carried by the closure plate to slidably support the T-shaped member and permit vertical movement thereof. The lower end of the T-shaped member is provided with a reduced portion 51. The upper end of the T-shaped member is provided with upwardly projecting arms 52 having horizontally disposed extensions 53. A spring 54 is arranged on the pin 36 and this spring is provided with downwardly extending terminals adapted to rest upon the extensions 53, as indicated at 55. The segmental gear is provided with a punched-out portion 56, which is adapted to engage the lower faces of the extensions 53 when the gear is oscillated (see Figure 4).

In operation, with the parts of the motor in the position shown in Figure 4 of the drawings, the pistons are moving to the right and approaching the end of a stroke. Normally, the spring 54 exerts a downward pressure on the T-shaped locking member 48 and the lower reduced end 51 of the locking member is disposed on one side of the finger 44 of the valve supporting member to prevent movement of the valve supporting member. As the pistons travel, the spring 47 at the left end of the piston unit engages the adjacent face of the finger 44 and is compressed. As long as the valve supporting member is locked in one position, the spring is further compressed. As the piston approaches the end of a stroke, the punched out portion 56 of the segmental gear engages the extension 53 to the right of the T-shaped arm and moves the T-shaped arm upwardly, releasing the finger 44 from the lower end 51 of this arm. The compressed spring immediately forces the valve supporting member to swing in a counter clockwise direction and this movement is limited by the engagement of the left shoulder 42 and the pin 43. The valve then assumes the position shown in Figure 6 of the drawings, connecting the left end of the cylinder to the source of suction and the operation is reversed. As soon as the pistons start to move in the opposite direction, and the segmental gear releases the T-shaped arm, the spring 54 lowers this arm to dispose the lower end 51 on the left side of the finger 42 to lock it while the same is still resiliently held in its new position by the left spring 47. After being locked, the spring pressure is removed from the finger 42 by the moving away of said spring with the left piston.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. Valve actuating mechanism for windshield cleaners having a casing, a movable member mounted in said casing and adapted to be actuated by a difference in pressure in the opposite ends of the casing, and means actuated by the movement of said member to alternately establish communication between the opposite ends of said cylinder and a source of operating pressure, said means comprising an element connected to said movable member, a spring means arranged on said element, a pivotally mounted valve supporting member adapted to be engaged by said spring means, a valve carried by said supporting member, means for positively locking said valve supporting member in either of two positions, and means for releasing said locking means.

2. Valve actuating mechanism for windshield cleaners having a casing, a movable member mounted in said casing and adapted to be actuated by a difference in pressure in the opposite ends of the casing, and means actuated by the movement of said member to alternately establish communication between the opposite ends of said cylinder and a source of operating pressure, said means comprising an element connected to said movable member, a spring means arranged on said element, a pivotally mounted valve supporting member adapted to be engaged by said spring means, said member being provided with a projecting finger, a valve carried by said member, a movable member normally engaging said finger to prevent movement of said valve supporting member, and means controlled by the movement of said movable member for moving said movable member to an inoperative position.

3. Valve actuating mechanism for windshield cleaners having a casing, a movable member mounted in said casing and adapted to be actuated by a difference in pressure in the opposite ends of the casing, and means actuated by the movement of said member, to alternately establish communication between the opposite ends of said casing and a source of operating pressure, said means comprising an a element connected to said movable member, a spring means arranged on said element, a pivotally mounted valve supporting member adapted to be engaged by said spring means, a valve carried by said member, a movable member normally engaging said valve supporting member to lock it against movement, means for normally retaining said member in its normal position, and means controlled by the movement of said movable member for moving said movable member from its normal position to release said valve supporting member for movement by said spring.

4. Valve actuating mechanism for windshield cleaners having a casing, a movable member mounted in said casing and adapted to be actuated by a difference in pressure in the opposite ends of the casing, and means controlled by the movement of said member to alternately establish communication between the opposite ends of said casing and a source of operating pressure, said means comprising an element connected to said movable member, a spring means arranged on said element, a pivotally mounted valve supporting member adapted to be engaged by said spring means, said member being provided with a projecting finger, a valve carried by said member, a movable locking member normally engaging said finger to hold said supporting member against movement while said spring is being compressed thereagainst, a spring engaging said locking member to normally retain it in its operative position in engagement with said finger, and means actuated by the movement of said movable member for moving said locking member to release said supporting member.

5. A device constructed in accordance with claim 4 wherein said locking member comprises a T-shaped arm, the lower end of which is adapted to engage said finger and the upper end of which is provided with means cooperating with a movable part of the motor for raising said T-shaped arm.

6. A device constructed in accordance with claim 4 wherein said locking member comprises a T-shaped arm, the lower end of which is adapted to engage said finger, and the upper end of which is provided with extensions, the lower faces of said extensions being adapted to be engaged by a movable part of said motor to raise said T-shaped arm, and the spring engages the upper faces of said extensions to normally retain said T-shaped arm in lowered position.

7. A motor for windshield cleaners comprising a casing, having a relatively large opening therein, a closure plate arranged in said opening, said closure plate being bored to provide passages communicating with opposite ends of said casing and a main passage, a valve member adapted to connect said main passage alternately with said passages, a pivotally mounted valve supporting member, movable back and forth from one to the other of two positions, a locking member normally engaging said supporting member to retain said valve successively in its two positions, means actuated by a movable part of the motor for rendering said locking member inoperative, and means for shifting said valve when released.

8. A motor for windshield cleaners comprising a casing having a relatively large opening therein, a movable actuating member arranged in said casing, a closure plate normally closing said opening, said closure plate being bored to provide a main passage connected to a source of operating pressure, and passages connected to the opposite ends of said casing, a valve adapted to connect said main passage and one of said passages, a valve supporting member pivotally mounted on said closure plate and carrying said valve, an element connected to said actuating member, a spring means carried by said element for shifting said valve supporting member, a locking member normally engaging said valve supporting member to hold it against movement, and means actuated by the movement of said actuating member for releasing said locking member.

9. A motor for windshield cleaners comprising a casing, a pair of connected pistons therein, a cleaner shaft journaled in the casing and operable by the pistons, valve actuating mechanism arranged within the casing between the pistons for operatively connecting the casing to a source of operating pressure and including a valve shifting member, resilient means movable with each piston for engaging the shifting member by and during movement of the piston to initially store up energy in said resilient means and then expend its stored up energy in effecting a shift of said member, means for locking the shifting member against movement until said resilient means has sufficient stored-up energy to effect a shift of said member, and means operable by and during movement of the pistons for rendering said rocking means inoperative.

10. A motor for windshield cleaners, comprising a casing, a piston therein, a shaft operable from the piston, valve actuating mechanism for operably connecting the casing to a source of operating pressure and including a valve shifting member having a lock-engaging part, a lock slidable into engagement with said part to hold the shifting member against movement, means operable by and during movement of said piston for moving the shifting member when released by said lock, and means operable by and during movement of said piston for sliding the lock out of engagement with said shifting member.

11. A motor for windshield cleaners comprising a casing, a piston therein, valve actuating mechanism for operatively admitting pressure into the casing to operate the motor and including a valve shifting member movable to two positions, a single lock for automatically locking the shifting member in both positions, means for effecting a movement of the shifting member from one position to the other position when said member is released by said lock, and means for effecting a positive release of said member from said lock during movement of said piston.

12. A motor for windshield cleaners, comprising a casing, a pair of connected pistons therein, valve actuating mechanism for operatively admitting operating pressure to the casing and including a valve shifting member movable to two positions and having a lock-engaging part, a wire stretched between the pistons and engaged with said part, a single lock engageable with one side of said part in one position of the valve shifting member and with the opposite side of said part in the other position of said shifting member to block its movement, a spring on each end portion of the wire for effecting movement of the shifting member when released by said lock, and means for rendering the lock inoperative by and during movement of the piston.

13. In a motor for windshield cleaners, a casing, a piston operable therein, a rockable wiper shaft operable by said piston, valve means for operatively admitting operating pressure to the casing including a valve shifting member movable to two positions, locking member movable into engagement with said means movable into engagement with said shifting member in either of its two positions for successively holding the same against movement therein, means carried by said shaft and engageable with said lock means toward each limit of oscillatory movement for rendering said lock means inoperative, and means for shifting said shifting member when released by said lock means.

14. In a motor for windshield cleaners, a casing, a piston operable therein, a wiper shaft rockable by said piston, means for operatively admitting operating pressure to said casing including a member movable to two positions, a lock slidable into engagement with said member in both of its positions for holding the same against movement, said lock having parts arranged on opposite sides of said shaft, means operable by said shaft for alternately engaging said parts to slide said lock from engagement with said member, and means for moving said member when released by said lock.

15. In a motor for windshield cleaners, a casing, a piston operable therein, a wiper shaft rockable by the piston, means for operatively admitting fluid pressure to the casing including a member movable to two positions, a lock engageable with said member in both positions for holding the same therein, said lock having spaced arms straddling the shaft, means normally holding the lock operative, means rockable with the shaft for alternately engaging the spaced arms and acting thereon to move the lock to an inoperative position, and means for moving said member when said lock is inoperative.

In testimony whereof, we affix our signatures.

FREDERICK G. FOLBERTH.
WILLIAM M. FOLBERTH.